No. 862,983. PATENTED AUG. 13, 1907.
W. S. LUCKETT.
METHOD OF FORMING CIGAR FILLERS.
APPLICATION FILED OCT. 31, 1904.
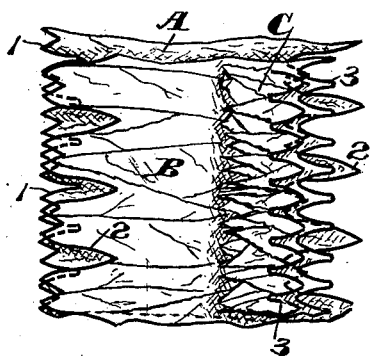
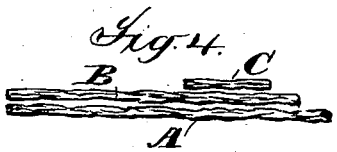

UNITED STATES PATENT OFFICE.

WILLIAM S. LUCKETT, OF EAST ORANGE, NEW JERSEY, ASSIGNOR TO INTERNATIONAL CIGAR MACHINERY COMPANY, OF NEW YORK, N. Y., A CORPORATION OF NEW JERSEY.

METHOD OF FORMING CIGAR-FILLERS.

No. 862,983.  Specification of Letters Patent.  Patented Aug. 13, 1907.

Application filed October 31, 1904. Serial No. 230,642.

*To all whom it may concern:*

Be it known that I, WILLIAM S. LUCKETT, a citizen of the United States, residing at East Orange, county of Essex, and State of New Jersey, have invented certain new and useful Improvements in Methods of Forming Cigar-Fillers, fully described and represented in the following specification and the accompanying drawings, forming a part of the same.

This invention relates to certain improvements in the method of forming cigar filler.

In the manufacture of the best grades of cigars by hand, the workman breaks from a group of leaves a section of filler which is as long as the cigar he is to make. This section of filler forms the base, so to speak, of the bunch, the shaping of the bunch being effected by adding to this base certain other filler lengths which are longer or shorter according to the shape of the cigar to be formed. In the formation of a "panetela" shape, for instance, in which the cigar bunch is substantially cylindrical, with a short taper at the head end, the bunch is shaped differently than in the case in the manufacture of a "perfecto" cigar which usually has a comparatively long taper at both ends.

In making cigars by machinery, the filler is subjected to the action of suitable forming mechanism, such, for instance, as rolls, which compact it and apply the binder thereto to form the bunch. Great difficulty has been experienced heretofore in making uniform and properly shaped bunches by machinery, this difficulty being in great part due to the fact that the fillers are not properly shaped, for it will of course be understood that if filler sections containing substantially the same amount of material throughout the length of the mass be subjected to the action of the rolling or shaping mechanism, the bunch will be harder or more compact at the place or places where the diameter of the cigar is reduced, so that the cigar does not draw well and smokes unevenly. It has been proposed to prepare filler material by arranging a layer of leaves in substantially parallel position and then severing this layer by cuts across the leaves into filler sections, the cuts being formed by two knives, one of which makes a cut of such a character as to properly shape what is known as the head end of the bunch, and the other knife being of such a character as to properly shape what is known as the tuck end of the bunch. According to this method of preparing filler, the knives sever from the layer sections of filler material, the head cutting knife forming the edges of two sections of filler material and the tuck cutting knife forming the edges of two sections of filler material. These sections of filler material were similar and were massed with corresponding cut edges lying in the same line, after which sections of the size of a filler were severed by cuts extending across the mass from edge to edge. According to this method of preparing filler material, in arranging the leaves in the layer prior to cutting, they were so distributed as to make the mass of a uniform thickness or density, the result of which was that the leaves would overlap, the tip ends of some of the leaves overlying the butt ends of other leaves. When the filler sections were cut from the layer, the successive cuts would vary widely in the length of leaf sections they contained, and there was no certainty that any cut would contain any considerable amount of the filler which was equal in length to the length of the bunch. In other words, the knives in operating would produce what are known as "shorts" and these shorts were liable to occur anywhere in the sections, and consequently, anywhere in the bunches formed from the sections, and it might happen that a very considerable number of the bunches would be made up entirely of shorts. It has also been proposed to cut a layer or stream of cigar filler into filler material by knives of such configuration that a knife at a single cut would form the tuck end of one section of filler material and the head end of the succeeding section. This method of cutting filler is open to the objection heretofore stated, that is, that there was a lack of uniformity in the length of leaves in successive sections, and to the further objection that it is impossible to form the filler material for certain shapes of cigars in this way. This is so, because a cut of proper configuration to properly form the tuck end of a section of filler material to be afterwards separated into fillers, would leave either too little or too much tobacco in the edge of the adjacent section, which edge was to form the tip end of a filler to be thereafter cut from that section. If, therefore, the knife was properly shaped to give the right amount of tobacco in the tip ends of the fillers, it would happen, with certain shapes of cigars, that the tuck ends of the fillers formed would be either too full or too scant, so that imperfect cigars would be formed.

The present invention has for its object to effect the formation of filler material for cigars in such a way that the presence of a sufficient quantity of long filler, that is, filler extending from end to end of the cigar, is assured in each cigar bunch which may be formed from the material.

A further object of the invention is to effect the formation of cigar filler material in such a way that the presence of a proper quantity of long filler in each cigar bunch separated from the filler material is assured and at the same time to insure the presence of a proper amount of filler in each bunch to properly shape the bunch, no matter what shape of bunch it may be desired to make.

With these and other objects not specifically referred to in view, the invention consists in a certain method of preparing cigar filler which will be hereinafter described and pointed out.

In order that the invention may be clearly understood, it will be described in connection with certain illustrative drawings which form a part of this specification, and in which Figure 1 represents, in plan view, a number of filler leaves grouped preparatory to the filler severing operations. Fig. 2 represents in plan view the same group of leaves after the severing operations have been perfected. Fig. 3 represents in plan view a mass of the prepared cigar filler, and Fig. 4 illustrates in side elevation the mass of filler shown in plan in Fig. 3.

In carrying out the invention, the operator first proceeds to form what is herein termed a main filler-section. This may be effectively accomplished by grouping together a number of tobacco leaves, these leaves being so arranged that their tips point in the same direction. In order to produce the best results, it is desirable that the leaves be grouped in such a way that the tip ends are substantially in register, though this is not absolutely essential, and it will be further understood that when the best results are to be produced, the leaves will be graded or selected, so that the groups will be formed of leaves of about the same length. After the leaves have been grouped in the manner described, they will be subjected to a severing operation which will form the main filler section, this section being marked A on the drawing. This main filler section will be sufficiently long so that the sections or lengths of leaves which make it up will extend substantially from end to end of the bunch or cigar to be formed from the filler material, thereby insuring the presence in the bunches to be formed of a certain amount of long filler. If the best results are to be produced, both edges of the main filler section will be shaped so as to present a series of salient and reëntrant angles, the relation of the material in successive salient cuts varying, however, with respect to the amount removed by the reëntrant cuts according to the shape of cigar to be produced. After the main filler section has been cut from the group of leaves, one or more additional sections will be cut therefrom, these sections being herein referred to as the "forming" sections. These forming sections will vary, of course, in their dimensions and in the amount of filler contained in the edges, where the edges are shaped by salient and reëntrant cuts, according to the shape of cigar which it is desired to make. The drawing illustrates a proper shape and arrangement of cuts of material to produce a cigar of perfecto shape. As shown in the drawing, two forming sections, B and C, are cut from the group of leaves, the section marked B being what is herein termed a "body forming section", and the section marked C being what is herein termed a "shoulder forming section."

In accordance with the method of severing shown in the drawing, the group of leaves is given a cut marked 1 which shapes the head end of the main filler section. The cut marked 2 forms the tuck end of the main filler section, and at the same time shapes the tuck end of the body forming section. The cut marked 3 completes the formation of the body forming section, and forms the shoulder forming section. After the group has been severed in the manner described, the several sections formed by the severing operations will be assembled, the sections by this assembling operation being brought into proper relation to each other. According to the particular manner of cutting illustrated in the drawing, the forming section B is placed upon the main section A with the edge formed by the cut 3 overlapping the edge formed by the cut 1, and the shoulder forming section is properly positioned on or with respect to the other two sections, so as to bring the edge formed by the cut 3 toward and into proper position with respect to what may be termed the tuck end of the filler mass.

The surplus material formed by the cut 1 will usually be small in amount if the group of filler leaves are properly selected with respect to the length of cigar which it is desired to form. This surplus material may, if small in amount, be added to the assembled mass at any desired point, the point varying according to the particular shape it is desired to give the cigar, or it may be disposed of as "scrap", or, if long enough, it may be used in connection with other leaves for cutting subsequent filler sections.

In carrying out the method practically, successive groups of leaves will be severed in the manner described, the severed sections assembled and placed in a suitable receptacle, after which the mass thus formed will be severed by cuts extending from edge to edge thereof, so as to separate successive amounts of filler therefrom, each of which is sufficient to form a bunch. It will be readily understood that according to this method of preparing filler, each bunch section of filler cut from the mass will always contain a certain amount of long filler. It will be further understood that by varying the amounts of tobacco in and the configuration of the edges of the sections which make up the mass, any desired shape of cigar can be readily produced, the amount of material which is to be introduced into the cigar at any given point in its length being thus controlled.

The method of cutting illustrated in the drawing is, as has been indicated, one by which excellent results will be produced where perfecto cigars are to be made from the filler. It will be understood, however, that the particular operations described will be varied according to the shape of cigars to be produced. Thus, for instance, while it will usually be desirable to shape the edges of the several sections in the manner described, this need not be always done, and the number of sections employed in building up the filler mass may be varied.

What is claimed is:—

1. The method of making filler material for cigars which consists in arranging a group of leaves with their tips pointing in the same direction, severing a mass of filler section from the group of a length equal to the cigar to be formed, severing a forming section from the group, and assembling the sections to form a mass of filler material from which fillers may be separated, substantially as described.

2. The method of forming filler material for cigars which consists in arranging a group of filler leaves with their tips pointing in the same direction, severing a main filler section from the group of a length equal to the cigar to be formed, severing a plurality of forming sections from the group, and assembling the sections to form a mass of filler material from which fillers may be separated, substantially as described.

3. The method of forming filler material for cigars which consists in arranging a group of tobacco leaves with their tips pointing in the same direction, severing from the group a main filler section equal in length to the cigar to be formed, severing from the group a body forming section and a shoulder forming section, the shoulder forming section being cut from the tip end of the group, and assembling the sections to form a mass of filler material from which fillers may be separated, substantially as described.

4. The method of forming filler material for cigars which consists in arranging a group of leaves with their tips pointing in the same direction, severing from the group a main filler section equal in length to the cigar to be formed on lines which cause the edges of the section to present salient and reëntrant angles, severing a body forming section from the group, and assembling the sections to form a mass of filler material from which fillers may be separated, substantially as described.

5. The method of forming filler material for cigars which consists in arranging a group of leaves with their tips pointing in the same direction, severing from the group a main filler section equal in length to the cigar to be formed on lines which cause the edges of the section to present salient and reëntrant angles, severing a body forming section from the group on lines which cause the edges of the section to present salient and reëntrant angles, and assembling the sections to form a mass of filler material from which fillers may be separated, substantially as described.

6. The method of forming filler material for cigars which consists in arranging a group of leaves with their tips pointing in the same direction, making three cuts in the group which sever the group into a main filler section equal in length to the cigar to be formed, a body forming section, and a shoulder forming section, the three cuts being made on lines which cause the cut edges to present salient and reëntrant angles, and assembling the sections to form a mass of filler material from which fillers may be separated, substantially as described.

In testimony whereof, I have hereunto set my hand, in the presence of two subscribing witnesses.

WILLIAM S. LUCKETT.

Witnesses:
A. WHITE,
W. H. KENNEDY.